Dec. 13, 1938.  C. L. SMITH  2,139,982
PROPELLER BLADE PITCH REGULATOR
Filed June 24, 1936   3 Sheets-Sheet 1
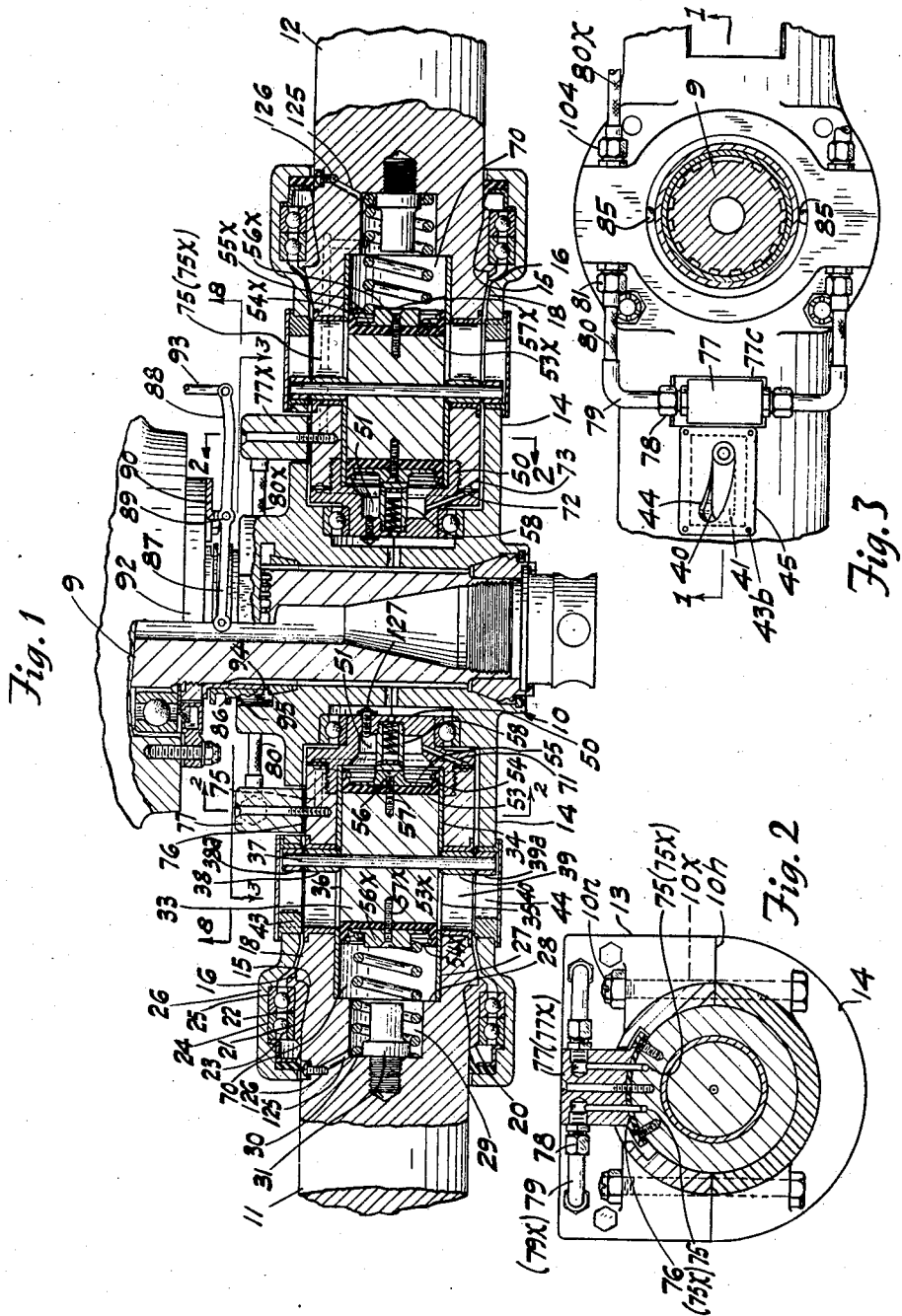

Dec. 13, 1938.　　　　C. L. SMITH　　　　2,139,982
PROPELLER BLADE PITCH REGULATOR
Filed June 24, 1936　　　　3 Sheets-Sheet 2

Charles L. Smith
INVENTOR.
BY
ATTORNEY.

Dec. 13, 1938.    C. L. SMITH    2,139,982
PROPELLER BLADE PITCH REGULATOR
Filed June 24, 1936    3 Sheets-Sheet 3

Charles L. Smith
INVENTOR.

BY
ATTORNEY.

Patented Dec. 13, 1938

2,139,982

UNITED STATES PATENT OFFICE 2,139,982

PROPELLER BLADE PITCH REGULATOR

Charles L. Smith, San Diego, Calif.

Application June 24, 1936, Serial No. 87,034

17 Claims. (Cl. 170—162)

This invention relates to propellers wherein the pitch of the propeller blades can be changed during the rotation of the propeller.

The invention in one of its broadest aspects relates to a propeller mounted on an aircraft engine crank shaft the pitch of whose blades is automatically varied by centrifugal force, and when so varied also acts as a governor to restore the propeller to its normal R. P. M. when the engine, tho set for such normal speed, gains or loses speed owing to flying conditions that increase or decrease its load.

The invention pertains more particularly to aircraft propellers, and relates to an automatic means to regulate the pitch of the blades of the propeller during flight, said means being subject to a manual control means.

The provision of means to vary the pitch of an airplane propeller is not broadly new. For some time it has been generally recognized that efficient propeller operation requires a change of the pitch setting of the blades for various conditions of operation. For example, that setting of the blades which is best for the "take off" is not the best for cruising, and a different pitch of the propeller blades is required for flight at great altitude than at lower elevations.

This invention provides improved, simplified means to effect the propeller blade regulation suitable to the flight conditions above alluded to, and to other conditions hereinafter pointed out.

One of the objects of the invention is to eliminate moving parts located in places where they will be exposed to the weather. Sleet and ice are major hazards with which operators of some of the adjustable pitch propellers now on the market have to contend during winter operations, owing to these propellers having moving or rotating parts located in exposed positions. Furthermore, in these constructions, the abrasive action of sand and dirt upon exposed mechanism is not to be ignored.

Further objects of the invention are, to provide a simplified hub-contained and hydraulically operable means to effect blade pitch variation; to provide a simplified combined manual and automatic blade pitch control; and to furnish superior automatic means to utilize the centrifugal force created by a rotating propeller as a means to regulate the pitch of the blades in such a manner to obtain their most effective action upon the air.

Still another object of the invention is to provide a superior means to utilize a spring element as a means for opposing the pressure thereagainst of a part which is acted upon by centrifugal force, said part forming a part of the mechanism for automatically effecting blade pitch variation.

Another object that may be mentioned is to provide, in conjunction with other features of the invention, an improved liquid controlled retarding or stabilizing means to guard against any too sudden changes in the pitch of the propeller blades.

This invention improves the efficiency of military aircraft, among the reasons for this fact being that it enables carrier landings to be effected in a more satisfactory manner and provides more efficient propeller service in passing quicker to higher and lower altitudes in maneuvering.

It is important that means be provided which will enable the aviator to adjust a lever or other control element in a position which will result in a selected number of R. P. M. of the propeller being maintained automatically and at the same time that the propeller blades be automatically maintained at the pitch affording greatest power efficiency. This very desirable end is secured by the mechanism hereinafter described and claimed.

Yet still another object of my invention is to provide improved means to take up the thrust of the propeller blades caused by centrifugal force tending to move the blades outwardly.

Other objects, advantages, and features of invention will hereinafter appear.

Referring to the accompanying drawings, which illustrate what is at present deemed to be a preferred embodiment of the invention, Fig. 1 is a mid-sectional view of the central portion of an aircraft propeller of the type having an even number of diametrically opposite propeller blades, the shank portions of such blades being shown. The plane of section is indicated by the line 1—1 of Fig. 3.

Fig. 2 is a cross section of a propeller blade shank and hub extension to receive the same on either of the lines 2—2 of Fig. 1, there being a conventional omission of parts that would otherwise appear in elevation.

Fig. 3 is a section on line 3—3 of Fig. 1.

Figure 4:
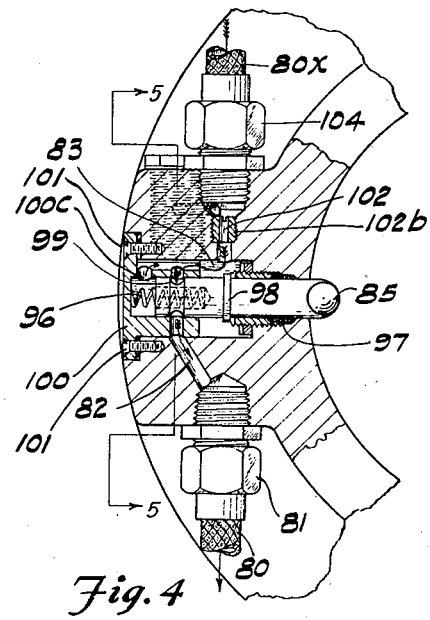
Fig. 4 is a sectional detail on an enlarged scale of a valve structure located in the upper portion of the hub shown in Fig. 3, the plane of section being farther from the observer than it is in the latter view.

Referring in detail to the drawings, in Fig. 1, the most comprehensive of the views, are shown an engine crank shaft 9, propeller hub 10 having diametrically opposite propeller blades, only shank portions 11 and 12 of which appear in the view. These blade shanks are respectively turnably mounted upon the radial hub extensions 13 and 14.

The two blade shanks shown are identical in structure and are therefore lettered the same as to details of structure. Describing first the shank 11 shown at the left, said shank is peripherally contoured as shown, thus providing around it a groove 15 along the inner side of which is an annular rib or rise 16 which is abrupt next to said groove to form a stop shoulder and is tapered at 18 along the inner or hub-ward side thereof.

A bearing supporting split ring 20 internally contoured to fit the grooved part 15, is secured around said part, said ring having pressed thereonto the inner ball bearing rings 21 and 22. The ball bearing structure is completed by the bearing balls 23, outer rings 24 and 25 and an outer housing element 26 formed by internally cavitating and diametrically enlarging the outer portion of the cylindrical hub extensions 13 (14). Further details of this bearing structure need not here be described. It need only be added that said bearing structure prevents centrifugal force from displacing each propeller blade and reduces frictional opposition to its automatic rotational adjustment, as hereinafter described.

The propeller shank 11 has an axial bore 27 formed in its inner end, said bore being diametrically contracted at 28 to form a seat 29 for the outer end portion of a compression spring 30 that is coiled around a centering stud 31, said stud having a screw threaded portion which enters an internally screw threaded seat therefor. Said spring 30 opposes the outward movement of a slidable plunger 33 under the urge of centrifugal force, said plunger having a working fluid tight fit within a sleeve 34 fitted within the bore 27. The stud 31 forms a bumper for said plunger.

Said sleeve 34 has diametrically opposite rectangular openings 35 and 36 therethru, thru which project the end portions of a pin 37 carrying on one of its end portions anti-friction sleeves or bushings 38, 38a and like sleeves 39, 39a on its opposite end portion. Said pin 37 is swaged into a bore provided therefor thru plunger 33. The sleeve openings 35 and 36 afford an unobstructed working space for the anti-friction sleeves 38 and 39.

The propeller hub 10, together with its extensions 13 and 14 are constructed according to the well known two part plan or the tubular type. See Fig. 2 where the housing halves are shown meeting at 10h and held together by bolts 10x having nuts 10n.

Figure 7:
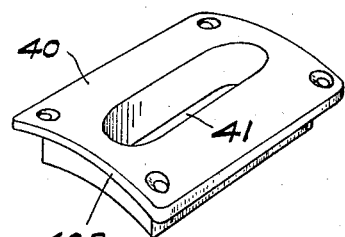
Fig. 7 is an enlarged perspective view of one of the slotted insert bushings.

The bored portion of the propeller blade shank 11 is furnished with diametrically opposite like rectangular openings into each of which is fitted a rectangular bushing 40, detailed in Fig. 7, having thru it a straight longitudinal guide slot 41 along which the anti-friction sleeve 38 (or 39) moves with a working fit. Said bushing has a flange 40a therearound furnished with screw holes to provide for its convenient attachment.

Figure 9:
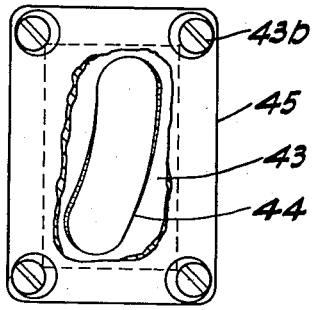
Fig. 9 is a plan view of the insert block and cover therefor shown in Fig. 3 on the left hand side, the central portion of said cover being broken away to disclose the contour of a slot in the block which may be varied to suit different horse-power motors.
Figure 10:
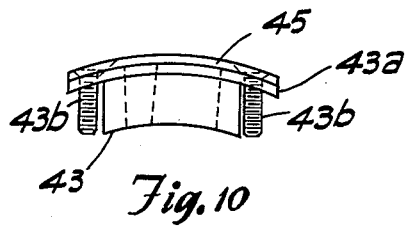
Fig. 10 is an end elevation of the parts shown in Fig. 9.

Outwardly beyond each bushing 40 the tubular hub extension 13 (14) has an opening through its wall to receive an insert block 43, Figs. 9 and 10, furnished with a deflected, curved slot 44 within which the outer anti-friction sleeve 38a (or 39a) has a working fit, the walls of said slot having a cam action on said sleeve. Said block 43 may have an attaching flange 43a thru which pass screw bolts 43b. A cover plate 45 may overlie each block 43 and be held in place by the same machine screws.

Figure 11:
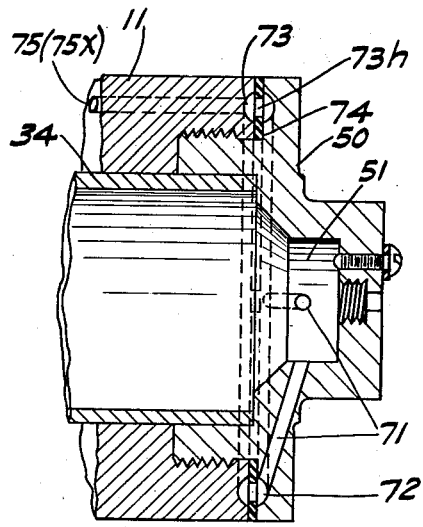
Fig. 11 is an enlarged reproduction of the structure shown in Fig. 1 a little to the left of the axis of the propeller hub. This view illustrates certain of the oil passages of the automatic equalizing system.

The mouth portion of the bore 27 of each propeller blade shank is diametrically enlarged and is internally screw threaded to have screwed thereinto a cavitated closure cap 50, Fig. 11, within and adjacent to which is thus formed an oil chamber 51. Said cap fits over the adjacent end portion of the sleeve 34. Within this part of the sleeve is fitted with a working fluid tight fit a flanged hydraulic cup 53, the flange thereof being held expanded by a circularly coiled spring 54. Said cup is held in place by a clamping plate 55 having a central boss 56 thru which passes a screw 57 tapped into the adjacent end of the plunger 33. At the opposite end of plunger 33 reference characters 53, 54, 55, 56 and 57 are duplicated with the addition of the letter x, to designate corresponding parts which afford a fluid tight working fit in that location also.

Figure 6:
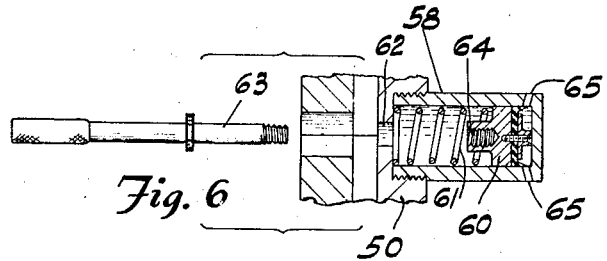
Fig. 6 is an enlarged longitudinal mid-sectional view of the liquid expansion take-up cylinder which is located in the cap structure at the inner end of each propeller blade. The detached, screw-threaded rod is used as a tool to partly withdraw the spring pressed follower during oil filling.

Said boss 56 contacts with the bottom of an elongated cylindrical cup 58 the opposite end of said cup being screwed into an internal seat provided therefor in the central portion of the cap 50. Referring to Fig. 6, within cup 58 fits with a fluid tight working fit a plunger 60 which is urged towards the bottom of the cup by a compression spring 61, there being a central vent aperture 62 thru the cap 50, which communicates with the open end of the cup 58 to relieve air pressure behind the plunger 60. In Fig. 6 is shown a detached retracting rod 63 which, at times is inserted thru vent 62 and screwed into a socket 64 provided therefor in the plunger 60, preparatory to retracting said plunger somewhat against the opposition of spring 61 while oil is permitted to enter the cup. Lateral oil passages 65 are located near the bottom of said cup. If, for any reason, the liquid in the equalizing system expands liquid enters the cup thru said passages 65 and relieves excess pressure.

One of the oil chambers 51 (see parts of Fig. 1 near the right and left sides of crank shaft) has already been referred to. These chambers form a part of the oil control means diagrammed in Fig. 12, whereby a uniform pitch of the propeller blades is secured for all their adjusted positions. At the outer end of each plunger 33 is also provided an oil chamber 70. Oil passages are furnished which afford communication between each oil chamber 51 on one side of the crank shaft and the oil chamber 70 on the opposite side thereof. Starting from one of said oil chambers 51, these passages may be traced as follows: From chamber 51 a drilled hole 71 connects with an annular groove 72 which is cut in cap 50 (see Fig. 11). Said groove 72 connects with another annular groove 73 by means of holes 73h cut thru an interposed gasket 74. Groove 73 connects in turn with a drilled passage 75 (Figs. 1 and 2) which turns and runs radially of the propeller hub up thru a gasket 76 and thru a connection block 77 whence it passes thru a connection 78 and on out into a tube 79 (Fig. 3) which has sweated into it a flexible tube 80. This passage continues thru said tube into a connection 81 on thru a passage 82 into a valve chamber 83 (see Fig. 4).

Figure 8:
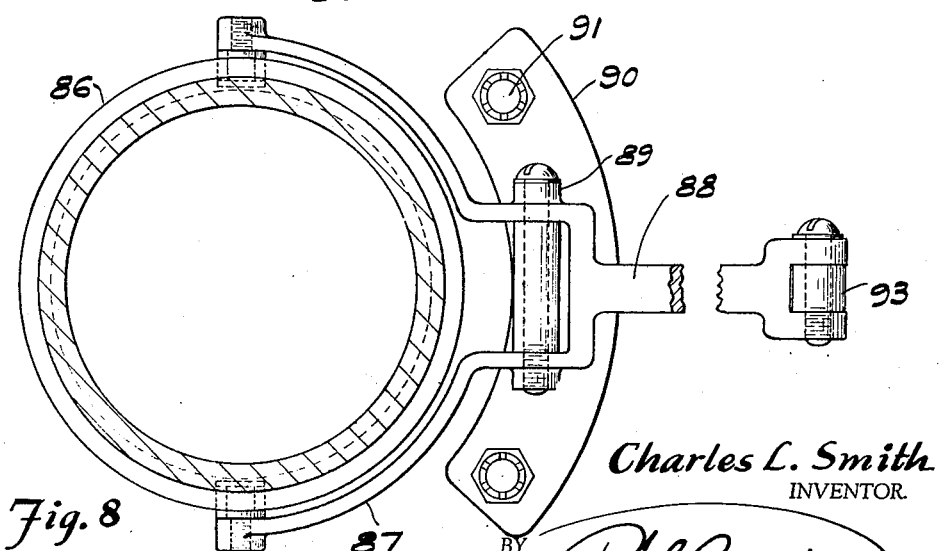
Fig. 8 is a section taken on line 8—8 of Fig. 1.

The flow of the oil thru chamber 83 is manually controllable by push pins 85 which are operated by mechanism at all times within the pilot's reach. Said mechanism comprises a slidable grooved ring 86, Fig. 1, movable axially of the crank shaft by the arms 87 of an operating lever 88 (see also Fig. 8) which has its bearing 89 on a bracket 90. Said bracket is fastened by cap screws 91 to the cover plate 92 (Fig. 1) on the front of the engine crank case. To the outer end portion of lever 88 is pivotally connected an operating rod 93 which leads to the cock pit.

When the operator desires to fixedly maintain the propeller blades at a pitch to which they have been automatically adjusted at any given time, he will operate the rod 93 in such a manner as to move the push pins inwardly, thereby causing them to intercept the circulation of the oil in both oil passages. The liquid pressure will thus be maintained unrelieved at the opposite ends of each plunger, preventing said plunger from shifting until the ring 86 has been withdrawn to permit the springs of the push pins to reproject them.

The slidable ring 86 is patterned (so far as its operating connection is concerned) after well known clutch mechanism, and therefore need not be further described except to state that it has a beveled end portion 94 which has a cam action upon the outer end of pin 85, and has around it a shallow locking groove 95 into which the pins 85 slide when the ring 86 is shifted as near to the hub as possible. Said ring must push the pin well down, against the opposition of its spring 96, well past the shut off position in order that when said pin enters said groove the valve will still be shut off. The pin 85 passes thru a packing gland 97 and has a stop flange 98 around it.

Continuing with the course of the oil passages, the push pin 85 has around it a groove 99 which may be brought into register with the oil passage 82 already mentioned. Said passage 82 leads thru one side of the elongated cap 100 of the valve chamber 83, said cap being attached by screws 101. The grooved portion of the push pin 85 has a working fit within the tubular body portion of said cap. The elongated cap 100 has an internal longitudinal groove 100c which allows the fluid to exit from its spring chamber as the pin 85 moves leftward as viewed in Fig. 4.

When the aviator releases the push pin 85 its spring moves it outwardly and the groove 99 is then in register with the passage 82 and is also in register with two other passages, namely a passage 102 at its opposite side in the main line, and a passage 118 which forms part of a by-pass control, later described in detail. Said passage 102 leads thru a removable piece or apertured plug jet 102b which contains a small hole and therefore retards the flow of the liquid when passing from connection 104 to connection 81. This piece is removable and may be replaced by other like pieces which have various sized holes and which are patterned differently in order to suit different planes and engines. Said passage 102 leads to a fitting 104, thence to tube 80x which leads to a conduit 79x (see Fig. 2) and thence to a passage 75x of block 77x to the right hand member (see Fig. 1) of the oil chambers 70. Fig. 2 is a reversed duplicate of corresponding parts at the opposite side of the propeller hub; therefore a few numerals in parenthesis on said view, having the letter x added, are used to designate reverse parts to those seen on one side of the propeller hub. Likewise in Fig. 1 75 and 75x are used to indicate the double character of the passage thus designated.

Mention has been made of the oil conduit means having flexible portions to permit relative turning movements of the parts connected. With the same end in view each connecting block 77 (or 77x) projects, as shown in Fig. 3, thru a casing opening 77c allowing an operating clearance at each end thereof.

Whenever a condition of flight occurs that lightens the load on the engine, thus causing an increase in the R. P. M. of the crank shaft, it is desirable that the plungers 33 move towards the crank shaft at a rapid speed, and that, when the load on the engine increases, they move away from the crank shaft at a slow speed. This regulation of the speed of plunger movement is secured by the valve structure shown in Figs. 4 and 5 which is located within the valve chamber 83 of Fig. 3.

Figure 5:
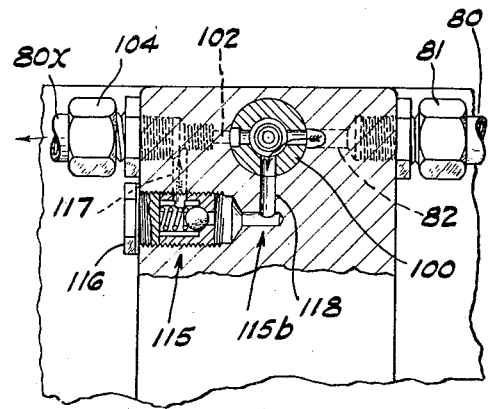
Fig. 5 is a view taken on line 5—5 of Fig. 4.

Referring to Fig. 5, the liquid may pass rapidly from connection 81 to connection 104, the check valve structure 115 permitting this. Said check valve structure may be of any approved design. It is shown contained within a tubular, externally threaded casing 116 which is screwed into a bore provided therefor. Said check valve structure is located in a bypass 115b (Fig. 5) comprising passage 118 (already mentioned) at one end and passage 117 at its opposite end.

In Fig. 4 the path of the liquid is indicated by arrows. The check valve 115 shown in Fig. 5 permits the liquid in the bypass to flow in one direction only, that is, the direction indicated by arrows in Fig. 4. The pin 85, which has already been described, controls the flow of the liquid through the portion of the main passage which is spanned by the bypass.

The oil chambers at the outer ends of the plungers 33 are furnished with bleed passages 125 controlled by bleed screws 126, and the oil chambers at the inner ends of said plungers have vents controlled by bleed screws 127.

Proceed as follows to fill the oil-containing portions of the mechanism:

Remove the whole assembly from the crank shaft 9. Remove all liquid conduits, 80, 80x, etc. (see Fig. 3) and then, after taking off nuts 10n (see Fig. 2), lift off the top half of the housing. Remove the two pairs of bleed screws 126 and 127. Then upstand the assembly on its left (as viewed in Fig. 1) end and with a pressure gun force the filling liquid in thru the connection block 77. In this case the pressure gun is applied to the connection 78 from which the conduit section 79 was removed. After thus filling reservoir 51 completely put back its bleed screw 127. All the other reservoirs are filled in a like manner. Gravity bleeding may also be used.

During the filling of reservoirs 51 it is necessary to hold the plunger 60 (see Fig. 6 and left central part of Fig. 1) of the expansion cylinder 58 at the half stroke position in order that, in operation, it will take in oil or put it back into the system depending on whether the oil expands or contracts. To do this, insert rod 63, screw it into the seat provided therefor and pull the plunger out half way after the reservoir is practically full. Then unscrew and remove the rod.

Referring to Fig. 1 the rings 20 underlying each of the ball bearings is of a split character to facilitate assembling and disassembling. To assemble, place the ball bearing assembly over the hub and push to the right (as viewed in Fig. 1) as far as possible. Then put the ring 20 in place and bring the ball bearing assembly back over it to the position shown. After this put in place the two halves or housing elements of the hub together with its extensions 13 and 14. The aforesaid ball bearing assemblies take all the thrust of the propeller blades caused by centrifugal force tending to move said blades outwardly.

The automatic adjustment of the pitch of the propeller blades is effected as follows:

When the propeller is at rest, the blades thereof are held from turning about their axes by reason of the pin 37 together with sleeves 38, 38a and 39, 39a mounted thereon being maintained in the same longitudinal position with respect to the slotted parts which they occupy. This condition results from the fact that the plungers 33 are held in their hub-ward positions by the compression springs engaging their outer ends, there being at such time no centrifugal force to move said plungers outwardly against the opposition of their said springs. If, now, the engine is started and its crank shaft 9 begins to rotate carrying with it the propeller blades and the intervening mechanism, a centrifugal force is set up which tends to force said plungers away from the crankshaft. The springs 30 at the outer ends of said plungers are of such strength that the centrifugal force on the plungers just equals their strength when the crank shaft rotates at 500 R. P. M. Therefore, there will be no change in the relative positions of the parts which control propeller blade pitch, until the crank shaft rotates faster than 500 R. P. M. However, when this does occur, the two plungers each start to move away from the crank shaft because each pin 37, together with the four antifriction sleeves carried thereby moves outwardly farther away from the crank shaft. Thereupon the outer antifriction sleeves carried by each pin 37 will be acted upon by the deflected cam slots of the insert blocks mounted in the walls of the tubular hub extensions, and thus the inner antifriction sleeves will be caused to react upon the slides of the straight slots which they occupy, which, in turn, will cause a turning movement of the propeller blades. As the speed of crank shaft rotation increases this turning movement of the blades will continue until the outer ends of each pair of cooperating slots are brought into alinement with each other. When the crank shaft speed slows down a reverse action to that just described will take place owing to the compression springs at the outer ends of the plungers reacting and moving said plungers towards the crank shaft against the lessening opposition of centrifugal force.

Figure 12:
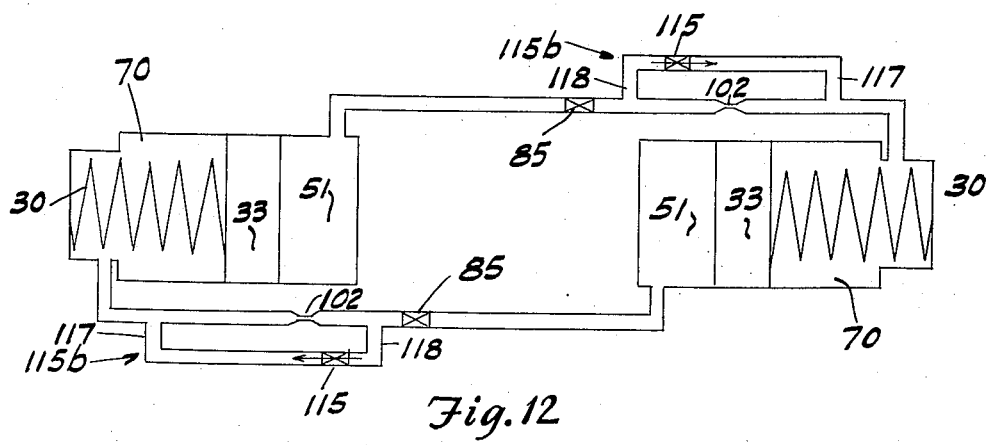
Fig. 12 is a diagrammatic illustration of the liquid (oil) control means whereby equalization of pitch adjustment is automatically maintained in a plurality of propeller blades.

The turning of the propeller blades the same amount for any given speed of crank shaft rotation is insured by the liquid-controlled equalizing mechanism which is diagramed in Fig. 12. The principle of this liquid equalization will be readily understood from said diagrammatic view, from which it will be seen that when either plunger 33 moves outwardly a given distance from the other a definite volume of the oil in its outer chamber 70 will be forced into the inner chamber 51 of the other plunger. Such volume of oil can gain exit from either of the chambers 70 only by entering the chamber 51 at the opposite side of the crank shaft. As the cross-sectional areas of all the four oil chambers are equal an equal plunger movement of both plungers in both directions is compelled. Furthermore, whenever either plunger moves outwardly under the urge of centrifugal force a suction is created behind it which facilitates the entrance of oil into the vacated space. Conversely, when either plunger moves inwardly a suction is created adjacent to its outer face which facilitates the entrance of oil into the adjacent outer chamber 33.

In this invention the pilot has the choice of an infinite number of pitch positions of propeller blades ranging from the extreme low to the extreme high.

The automatic feature of the propeller also tends to act as a governor, thereby contributing to constant speed, the pilot setting his throttle to the desired number of engine revolutions. The plungers and their pins or bosses under the centrifugal force generated by the rotation of the propeller move outwardly increasing, or inwardly decreasing the pitch of the propeller blades, depending on whether the airplane is nosed down, which would cause the propeller to have a tendency to gain in revolutions, or is climbing, which would cause it to have a tendency to lose revolutions. In other words if the engine has a tendency to increase its revolutions the pitch of the propeller is automatically increased thus keeping the revolutions constant. In the same manner the tendency of the engine to lose revolutions is overcome by the propeller decreasing the pitch setting of the blades automatically.

When the pilot throttles his engine for gliding or landing the propeller automatically adjusts itself to its extreme low pitch setting rapidly. It assumes a high pitch setting gradually to compensate for gradual increase in R. P. M., when the throttle is open.

Every aircraft engine has a range of revolutions within which it is highly desirable that it be operated while cruising, and also one given pitch setting for the propeller which is most efficient. The necessary strength of the plunger spring described in this invention can be easily figured for any given engine with any given propeller so that the force exerted by it will allow the plunger under the centrifugal force generated by the revolving propeller to move outward the necessary distance to rotate the blades to the most desirable setting and to cause a balance between the plunger and centrifugal force at any R. P. M. of motor.

It should be understood that the present disclosure is for the purpose of illustration only and that this invention includes all modifications and equivalents which fall within the scope of the subject matter claimed.

What is claimed is as follows:

1. In a mechanism of the kind described, a hub, diametrically opposite propeller blades carried thereby, said hub having for each said blade a radial extension the axis of which coincides with the axis of a said blade mounted thereon, there being an elongated cylindrical chamber located axially within each said blade and extension, a plunger slidably fitted in a liquid-tight manner within said chamber, a spring to oppose the outward movement of said plunger within said chamber under the urge of centrifugal force, and a pin and cam slot connection between said plunger and hub extension whereby the sliding movements of said plunger under the spring opposed urge of centrifugal force adjust the pitch of said blades, there being liquid contained within one of said chambers at the inner end of the plunger in said chamber and liquid in the other of said chambers at the outer end of the plunger therein, and there being liquid conduit means between the liquid-containing portions of said chambers, whereby a change in the position of one plunger compels a like change in the position of the other.

2. The subject matter of claim 1 and, a manually operable means to open and close the passage thru said conduit means thereby, at will, to cause said blades to remain fixed in the selected adjustment with relation to their pitch.

3. In a device of the kind described a propeller hub, a plurality of propeller blades whose butt ends are mounted in said hub, each of said butt ends having a cylindrical bore extending radially of said hub, a plunger mounted in each of said bores and movable axially thereof, connecting means between said plungers and hub whereby to twist the butt ends of the blades during the movement of said plunger, fluid means filling the front and rear spaces in said bores unoccupied by said plungers, and conduits connecting the fluid space in front of one plunger with the fluid space in the rear of another plunger.

4. In a device of the kind described a propeller hub, a plurality of propeller blades whose butt ends are mounted in said hub, each of said butt ends having a cylindrical bore extending radially of said hub, a plunger mounted in each of said bores and movable axially thereof, connecting means between said plungers and hub whereby to twist the butt ends of the blades during the movement of said plunger, fluid means filling the front and rear spaces in said bores unoccupied by said plungers, conduits connecting the fluid space in front of one plunger with the fluid space in the rear of another plunger, and means including a check valve to restrict the rate of flow of fluid thru said conduits from one bore to another as said plungers are caused to move outwardly under the urge of centrifugal force.

5. In a mechanism of the kind described, a propeller hub having chambers therein, blades mounted on said hub to turn about their axes, plungers fitted within said chambers and movable radially of said hub under the action of centrifugal force, yieldable means mounted in said hub to oppose the action of centrifugal force upon said plungers, a conduit means connecting said chambers on opposite sides of said hub, there being a liquid in said chambers and in said conduit means to equalize the movements of said plungers, means operatively connecting said plungers with said propeller blades to vary their pitch, and a pressure relief means mounted in said hub to yieldingly oppose excessive pressure exerted by said liquid.

6. In a mechanism of the kind described, a hub, a plurality of propeller blades carried thereby and adjustable about their axes with relation thereto, said hub having for each of said blades an extension, there being an elongated radially extending chamber within a portion of each said blade which occupies each said extension, a plunger slidably mounted in each said chamber, a spring mounted in each said chamber and positioned to oppose the outward movement of each said plunger under the urge of centrifugal force, a hydraulic fluid filling the empty space in the several chambers, means connecting the fluid at the inner end of one plunger with the fluid at the outer end of another plunger, there being diametrically opposite slots through the walls of each said chamber, said slots being at all times internally covered by each said plunger, and means projecting from each said plunger thru said slots to vary the pitch of each of the adjacent propeller blades, each said hub extension having cam portions which each said projecting means engage.

7. In a mechanism of the kind described, a hub, a plurality of propeller blades carried thereby and adjustable about their axes with relation thereto, said hub having for each of said blades an extension, there being an elongated radially extending chamber within a portion of said blade which occupies said extension, a plunger slidably mounted in said chamber, a spring mounted in said chamber and positioned to oppose the outward movement of said plunger under the urge of centrifugal force, there being diametrically opposite slots through the walls of said chamber, said slots being at all times internally covered by said plunger, and means projecting from said plunger thru said slots to vary the pitch of the adjacent propeller blade, said hub extension having cam portions which said projecting means engage, there being a liquid contained in a plurality of said elongated chambers, said liquid being acted upon by the plunger in each said chamber, and there being liquid conduit means between said chambers whereby a change in the position of one plunger compels a like change in the position of the others.

8. In a device of the kind described, a propeller hub, a plurality of propeller blades whose butt ends are mounted in said hub, each of said butt ends having a cavity, a plunger mounted in each of said cavities, connecting means between said plungers, blades and hub to twist said blades during the movement of said plungers, fluid means occupying the inner and outer portions of said cavities unoccupied by said plungers, and conduit means connecting the inner fluid cavity in one blade with the outer fluid cavity in another blade.

9. In a device of the kind described, a propeller hub, a plurality of propeller blades whose butt ends are mounted in said hub, each of said butt ends having a cavity, a plunger mounted in each of said cavities and movable axially thereof, connecting means between said plungers, blades and hub whereby to twist said blades during the movement of said plungers, fluid means filling the outer and inner spaces in said cavities unoccupied by said plungers, and means connecting the outer fluid cavity in one blade with the inner fluid cavity in another blade.

10. In a device of the kind described, a propeller hub, a plurality of propeller blades whose butt ends are mounted in said hub, each of said butt ends having a cylindrical bore extending radially of said hub, a plunger mounted in each of said bores and movable axially thereof, connecting means between said plungers, blades and hub whereby to vary the pitch of the blades during the movement of each said plunger, fluid means filling the outer and inner spaces in said bores unoccupied by said plungers, conduits for conducting fluid from the outer end of the plunger in one bore to the inner end of a plunger in another bore, and means to throttle the flow of fluid thru said conduits from one bore to another as said plungers are caused to move outwardly and inwardly.

11. In a mechanism of the kind described, a propeller blade having a cylindrical shank with a cylindrical chamber extending axially into its inner end, a sleeve fitted within said chamber, a cap secured to the inner end of said shank and closing said sleeve in said chamber, a propeller hub having a radial extension containing a socket which turnably receives said propeller blade shank, a plunger slidably fitted within said sleeve, a spring opposing the outward movement of said plunger under the urge of centrifugal force, and a pin and cam slot connection between said plunger and hub extension automatically to vary the pitch of said propeller blade to suit varying speeds of rotation of the propeller, said pin fitting in a slot in said blade.

12. In a mechanism of the kind described, a propeller hub having a pair of cylindrical sockets therein, propeller blades each having an end journalled in a respective socket for rotative movement on the axis of the socket, each of said blades having a chamber in its journalled end, and each chamber being closed at both ends, plungers each slidably mounted in a respective chamber, incompressible fluid means connecting said chambers on the outer side of one plunger and on the inner side of the other and maintaining said plungers evenly spaced from the axis of the hub, and means actuated by the sliding movement of said plungers for causing uniform rotation of the blades upon movements of the plungers in said chambers to vary the pitch.

13. In a mechanism of the kind described, a propeller hub having a pair of radially disposed cylindrical sockets therein, propeller blades each having an inner end journalled in a respective socket, said inner ends having an axially extending chamber therein closed at both ends, plungers each slidably mounted in a respective chamber, fluid conduit means connecting the inner end of one chamber with the outer end of the other chamber, said connected ends of the chambers and the conduit being filled with incompressible fluid, conduit means communicating with the remaining ends of said chambers, and means actuated by the movements of the plungers constructed and arranged to cause rotation of the blades on the axes of said chambers.

14. In a mechanism of the kind described, a propeller hub having a pair of radially disposed cylindrical sockets therein, propeller blades each having an inner end journalled in a respective socket, said inner ends each having an axially extending chamber therein closed at both ends, plungers each slidably mounted in a respective chamber, fluid conduit means connecting the inner end of one chamber with the outer end of the other chamber, said connected ends of the chambers and the conduit being filled with incompressible fluid, conduit means communicating with the remaining ends of said chamber, means actuated by the movements of the plungers constructed and arranged to cause rotation of the blades on the axes of said chambers, and valve means controlling the flow of the fluid through said conduit.

15. In a mechanism of the kind described, a propeller hub having a pair of radially disposed cylindrical sockets therein, propeller blades each having an inner end journalled in a respective socket, said inner ends each having an axially extending chamber therein closed at both ends, plungers each slidably mounted in a respective chamber, fluid conduit means connecting the inner end of one chamber with the outer end of the other chamber, said connected ends of the chambers and the conduit being filled with incompressible fluid, conduit means communicating with the remaining ends of said chambers, means actuated by the movements of the plungers constructed and arranged to cause rotation of the blades on the axes of said chambers, and flow restricting means fixed in said conduit and permanently restricting the flow of the fluid therethrough.

16. In a mechanism of the kind described, a propeller hub having a pair of radially disposed cylindrical sockets therein, propeller blades each having an inner end journalled in a respective socket, said inner ends each having an axially extending chamber therein closed at both ends, plungers each slidably mounted in a respective chamber, fluid conduit means connecting the inner end of one chamber with the outer end of the other chamber, said connected ends of the chambers and the conduit being filled with incompressible fluid, conduit means communicating with the remaining ends of said chambers, means actuated by the movements of the plungers constructed and arranged to cause rotation of the blades on the axes of said chambers, flow restricting means fixed in said conduit and permanently restricting the flow of the fluid therethrough, and valve means controlling the flow of the fluid through said conduit.

17. In a mechanism of the kind described, a propeller hub having a pair of radially disposed cylindrical sockets therein, propeller blades each having an inner end journalled in a respective socket, said inner ends each having an axially extending chamber therein closed at both ends, plungers each slidably mounted in a respective chamber, fluid conduit means connecting the inner end of one chamber with the outer end of the other chamber, said connected ends of the chambers and the conduit being filled with incompressible fluid, conduit means communicating with the remaining ends of said chambers, means actuated by the movements of the plungers constructed and arranged to cause rotation of the blades on the axes of said chambers, flow restricting means fixed in said conduit and permanently restricting the flow of the fluid therethrough, valve means controlling the flow of the fluid through said conduit, and a valved bypass connecting said conduit at opposite sides of said flow restricting means.

CHARLES L. SMITH.